United States Patent
Bremer et al.

(10) Patent No.: US 7,130,338 B2
(45) Date of Patent: Oct. 31, 2006

(54) APPARATUS AND METHOD FOR COMMUNICATING VOICE AND DATA BETWEEN A CUSTOMER PREMISES AND A CENTRAL OFFICE

(75) Inventors: Gordon Bremer, Clearwater, FL (US); Thomas Bingel, Belleair Beach, FL (US)

(73) Assignee: Paradyne Corporation, Largo, FL (US)

( * ) Notice: Subject to any disclaimer, the term of this patent is extended or adjusted under 35 U.S.C. 154(b) by 310 days.

(21) Appl. No.: 10/811,531

(22) Filed: Mar. 29, 2004

(65) Prior Publication Data

US 2004/0179662 A1 Sep. 16, 2004

Related U.S. Application Data

(62) Division of application No. 09/375,200, filed on Aug. 16, 1999, now abandoned, which is a division of application No. 09/374,774, filed on Aug. 16, 1999, now Pat. No. 6,546,090, which is a division of application No. 08/962,796, filed on Nov. 3, 1997, now Pat. No. 6,061,392.

(60) Provisional application No. 60/033,660, filed on Dec. 17, 1996.

(51) Int. Cl.
*H04B 1/38* (2006.01)
*H04J 1/02* (2006.01)
*H04J 3/16* (2006.01)
*H04M 9/00* (2006.01)

(52) U.S. Cl. ........................ 375/222; 370/468; 370/493; 379/399.01

(58) Field of Classification Search ................ 375/222, 375/223; 370/433, 468, 493–495; 379/32.04, 379/88.13, 93.01, 93.08, 93.09, 93.28, 93.31, 379/160, 399.01
See application file for complete search history.

(56) References Cited

U.S. PATENT DOCUMENTS

| | | | |
|---|---|---|---|
| 4,685,129 A | * | 8/1987 | Gavrilovich ................ 379/324 |
| 5,400,322 A | | 3/1995 | Hunt et al. ................... 370/19 |
| 5,878,077 A | * | 3/1999 | Betts .......................... 375/222 |

OTHER PUBLICATIONS

"Multicarrier Modulation for Data Transmission: An Idea Whose Time Has Come" by John A.C. Bingham, Published May 1990 in IEEE Communications Magazine.

* cited by examiner

*Primary Examiner*—Don N. Vo
(74) *Attorney, Agent, or Firm*—Thomas, Kayden, Horstemeyer & Risley, LLP

(57) ABSTRACT

Systems and methods are provided for communicating data over a subscriber loop using a modem. One such method includes: transmitting data on the loop in a first frequency band; sensing an indication that simultaneous transmission on the loop in a POTS frequency band is imminent; and adjusting transmit power in the first band, in response to the sensing step. One such system includes an input/output connection in communication with the loop, a processor operable in at least two states, a means for sensing demand for simultaneous usage of the loop, and a means for controlling the state. The first state is characterized by a first transmit power spectrum in the first band. The second state is characterized by a second transmit power spectrum in the first band, reduced relative to the first spectrum. Upon sensing demand, the control means causes the processor to operate in the second state.

28 Claims, 7 Drawing Sheets

APPARATUS AND METHOD FOR COMMUNICATING VOICE AND DATA BETWEEN A CUSTOMER PREMISES AND A CENTRAL OFFICE

CROSS-REFERENCE TO RELATED APPLICATIONS

This application is a divisional of application Ser. No. 09/375,200, filed on Aug. 16, 1999 now abandoned, which is a divisional of application Ser. No. 09/374,774, filed Aug. 16, 1999 now U.S. Pat. No. 6,546,090, which is a divisional of application Ser. No. 08/962,796, filed Nov. 3, 1997 now Pat. No. 6,061,392, which claims the benefit of provisional application Ser. No. 60/033,660, filed on Dec. 17, 1996, which is entirely incorporated herein by reference.

FIELD OF THE INVENTION

The present invention generally relates to system for communicating both voice and data over modems, and more particularly to high speed modems offering robust communication between a central office and a customer premises.

BACKGROUND OF THE INVENTION

High speed digital modems, such as Rate Adaptive Digital Subscriber Loop (RADSL) modems, are able to transfer data at high rates over the local loop, because they use frequencies which are significantly higher than the voice band frequencies used in Plain Old Telephone Service (POTS). By way of example, speech on a POTS system generally occurs in the frequency spectrum between about 0 Hz (DC) and about 4 kHz, whereas RADSL modems use the frequency spectrum of between about 20 kHz to about 1 MHz. High speed digital modems generally include error detection circuitry which measures the errors which occur during communications. By making such measurements, they are then able to update their statistical knowledge of the wire pair which extends between the subscriber's location and the central office. Using that statistical knowledge, the modems can select optimal operating speeds. These modems were originally proposed when it was thought that services such as video-on-demand would be desirable. As modem technology has developed, another need has arisen, in that the Internet has become a popular medium for both personal and work related use.

While the high speeds of RADSL modems seem to be quite desirable, their use of high frequencies mean that they also need to be protected from high frequency noise, such as cross-talk from adjacent channels or adjacent loops in the loop cable binder, as such noise causes them to downwardly adjust their operating speeds. In order to avoid certain types of noise, RADSL modems typically require the use of filters, called POTS filters, together with splitters for isolating Public Switched Telephone Network (PSTN) equipment from the RADSL modems. Indeed, without POTS filters and POTS splitters, POTS signals directly interfere with the RADSL spectrum below about 20 kHz and the RADSL signals directly interferes with the POTS spectrum. POTS filters and POTS splitters reduce the interference of POTS signaling transients on RADSL data transmission. In addition, the use of the high RADSL bandwidth demands relatively high transmit power, which can cause distortions and dynamic range overload to POTS equipment.

Unfortunately, the manufacture and installation of POTS filters and splitters are expensive, and their use sometimes requires rewiring of the customer premises to ensure that all PSTN equipment is properly isolated from the RADSL modems and computing equipment. Consequently, it would be desirable to avoid the use of POTS splitters and filters, in order to avoid the expense they impose (e.g., purchase cost and possible rewiring of customer premises).

Accordingly, there appears to be a need for a mass market modem which has data transfer rates greater than the 33.6 Kbps attainable by PSTN modems, yet under the rate that requires the addition of POTS filters, splitters, etc. to address noise and deleterious transmission line effects often encountered in high speed DSL modems.

Yet another problem which appears with increased Internet access and data communications is the increasingly limited availability to the customer phone line or local loop for its original purpose, i.e., voice communications. Of course, one solution is for a customer to purchase an additional phone line. This, however, imposes an additional cost on the customer. Moreover, unless the line is dedicated by the customer for a specific purpose (which is poor utilization), the second line may not always be available when needed.

Accordingly, there is a need to provide an improved modem that accommodates data transmissions, while simultaneously allowing traditional voice operation of a telephone attached to the same line at the customer premise. It is particularly desirable to have such a modem that does not require the use of costly POTS filters and splitters.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to methods and apparatus for communicating data across a subscriber loop, in a manner that senses and adapts to the simultaneous transmission of POTS (e.g., voice or PSTN modem) information across the subscriber loop. In accordance with one aspect of the invention, a method is provided for communicating data over a subscriber loop using a modem comprising the steps of: transmitting data on the loop in a first frequency band; sensing an indication that simultaneous transmission on the loop in a POTS frequency band is imminent; and adjusting transmit power in the first band, in response to the sensing step.

In accordance with another aspect of the preferred embodiment, a modem is provided for communicating data across a subscriber loop. The modem includes an input/output connection in communication with the subscriber loop, a processor unit configured to operate in one of at least two states, a sensing means for sensing a demand for simultaneous usage the subscriber loop, and a control means responsive to the sensing means for controlling the operating state of the processor unit. Upon sensing demand for usage, the control means causes the processor to operate in the second state. The first state is characterized by a first transmit power spectrum in a first frequency band, while the second state is characterized by a second transmit power spectrum in the first frequency band, where the second transmit power spectrum is reduced relative to the first transmit power spectrum. The simultaneous usage occurs in a POTS frequency band.

BRIEF DESCRIPTION OF THE DRAWINGS

The accompanying drawings incorporated in and forming a part of the specification, illustrate several aspects of the present invention, and together with the description serve to explain the principles of the invention.

DETAILED DESCRIPTION

Figure 1:
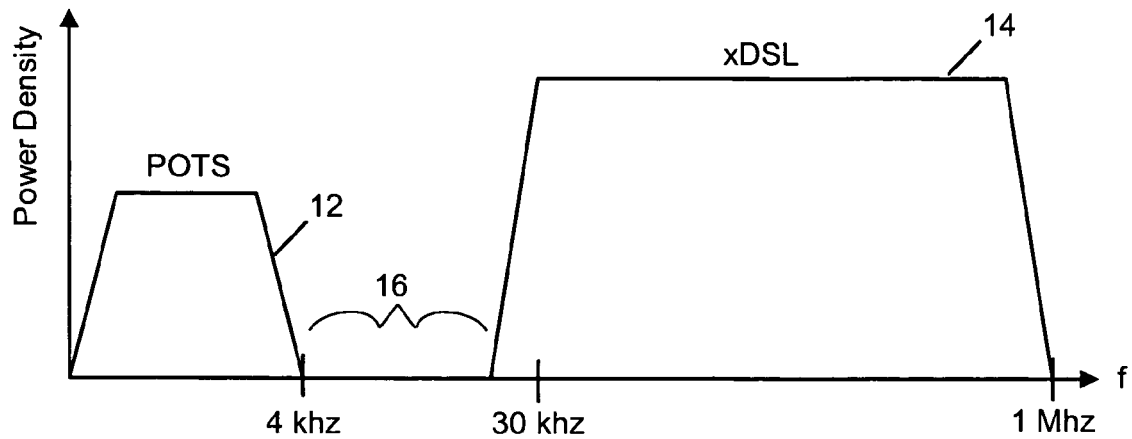
FIG. 1 is an illustration of the frequency spectrum of a dual frequency band communications system of the prior art, depicting the POTS transmission frequency band and the xDSL transmission frequency band.

Having summarized the invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Turning now to the drawings, FIG. 1 is a diagram illustrating frequency band communications, as is known in the prior art. The term frequency band communications is used to indicate communication of information within a certain defined frequency band. As is known in the prior art, plain old telephone system (POTS) communications are transmitted in the frequency band 12 defined between about 0 (DC) and about 4 kHz. A second transmission frequency band 14 is defined at a higher frequency level than the POTS frequency band 12, and is used in the transmission of digital subscriber line (DSL) communications. A guard dead band 16 is typically provided to separate the two transmission frequency bands 12 and 14. The DSL transmission frequency band 14 is more broadly denominated as "xDSL", wherein the "x" generically denominates any of a number of transmission techniques within the DSL family. For example, ADSL—Asymmetric Digital Subscriber Line, RADSL—Rate Adaptive Digital Subscriber Line, HDSL—High-Bit-Rate DSL, etc. As is known, xDSL transmission frequency bands 14 may encompass a bandwidth of greater than 1 MHz. As a result, and for the reasons described above, without the addition of extra equipment such as POTS filters, splitters, etc., xDSL signals are not compatible with attached POTS type equipment, such as telephones, PSTN modems, facsimile machines, etc.

As will be discussed in more detail below, the present invention provides an upper transmission band having an upper frequency boundary that is much lower than the 1 MHz frequency boundary often encountered in xDSL transmissions. Indeed, the upper frequency boundary of the present invention is defined in a range that is readily supported by, or compatible with, transmission systems (and attached POTS-type equipment) presently in place between a customer premises and a central office, without the need for extraneous devices such as POTS filters and POTS splitters.

Figure 2:
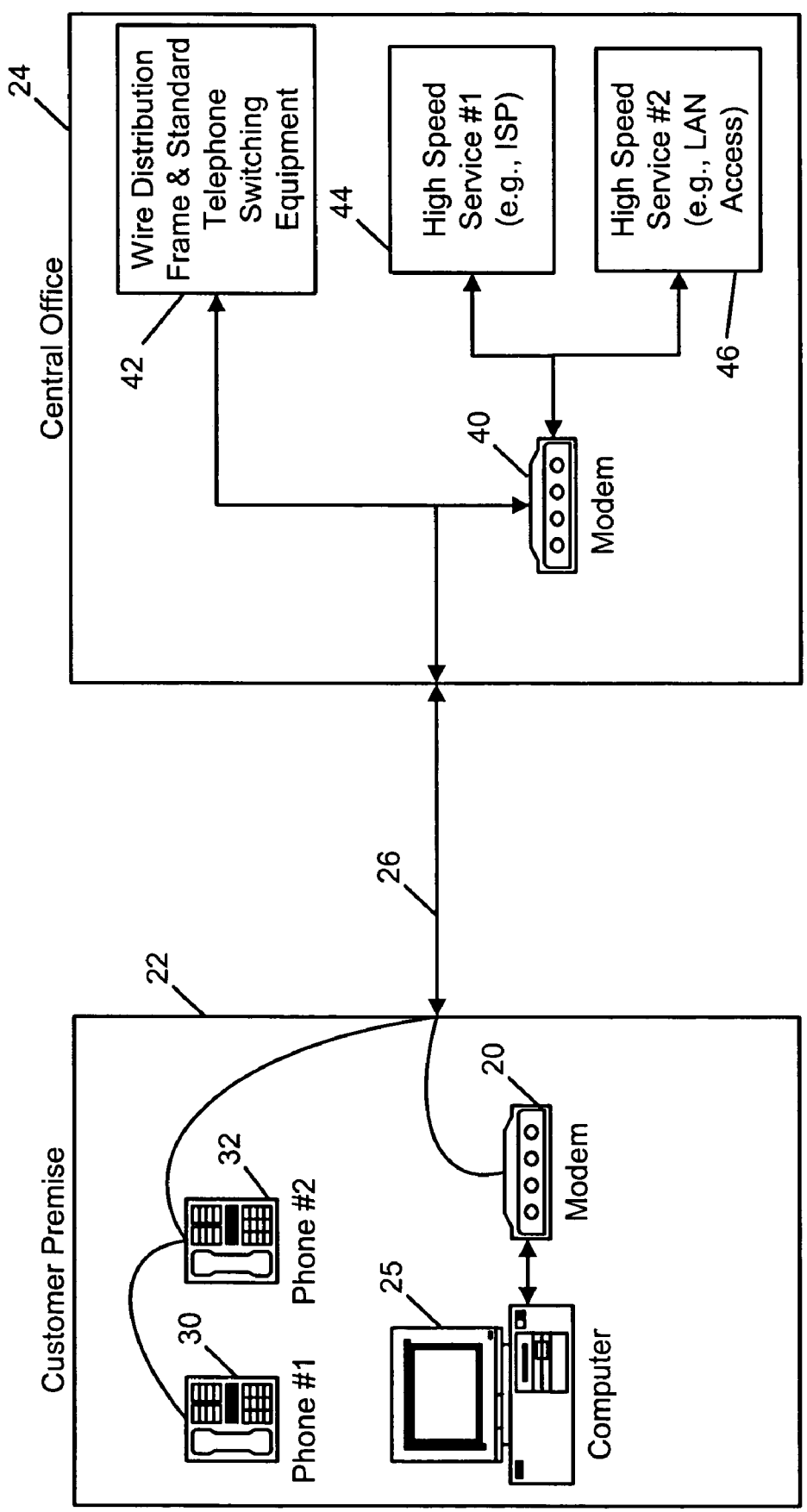
FIG. 2 is a block diagram illustrating the primary components in a system utilizing the present invention.

In this regard, reference is made to FIG. 2, which is a top level diagram illustrating the principal hardware components of a system utilizing the present invention. In accordance with one aspect of the invention, a modem 20 is provided for achieving efficient data communications between a customer premises 22 and a central office 24 across a local loop 26 by dynamically allocating a transmission frequency bandwidth and/or power for transmitting data. Certainly, one of the factors motivating the development of the present invention is the expanded demand for higher speed communications in recent years. This enhanced demand is primarily attributed to communications over the Internet.

The present invention dynamically allocates a data transmission frequency band and/or power spectral density (PSD) in response to POTS communications across the same line. More particularly, the present invention may utilize the frequency band otherwise allocated for POTS/voice transmission, at times when there is no present demand for transmitting voice information. When, however, there is a demand for voice transmissions, then the present invention reallocates the transmission frequency band and PSD for the data communications so that there is no overlap or interference with the POTS transmission frequency band 12, and no significant interference to POTS-type attached equipment.

In keeping with the description of FIG. 2, the customer premises 22 may be a single-family household having a single phone line 26 for communicating between the customer premises 22 and a central office 24. Within the house or customer premises 22, multiple connections branch off of the local loop 26 and are terminated at phone jacks (such as RJ-11) located in various rooms of the household. In this way, multiple telephones 30 and 32 may be plugged in and supported from the same phone line 26. In the same way, a personal computer 25 may be disposed in communication with the local loop 26 by way of a modem 20.

Presently, unless a user purchases an additional phone line, or a more costly communication service, such as xDSL, simultaneous transmissions of voice and data to different locations are not possible. As a result, one person in a household may have the local loop 26 tied up with data communications (such as Internet communications), while another person at the same household is awaiting the use of the local loop 26 for voice communication. In accordance with the present invention, and as will be discussed in more detail below, this shortcoming is overcome.

In keeping with the description of FIG. 2, a companion modem 40 that is compatible with the modem 20 is provided at the central office 24. As is known, other equipment, such as wire distribution frame and standard telephone switching equipment 42, may also be in communication with the local loop 26. Since the configuration and operation of such equipment is known in the prior art and does not affect or impact the present invention, it will not be discussed. FIG. 2 also illustrates a variety of services that may be connected at the central office 24 to the modem 40, constructed in accordance with the present invention. These services may include a high speed ISP service 44, a high speed LAN access service 46, etc. Again, since the provision and operation of such services are generally understood and are further not necessary in order to describe the operation of the present invention, they will not be described.

Figure 3A:
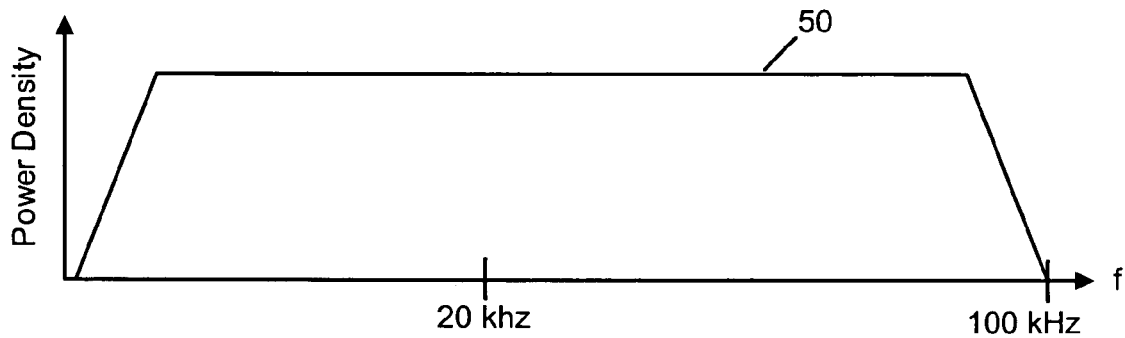
FIG. 3A is a frequency spectrum illustrating the full-band transmission frequency band of the present invention.
Figure 3B:
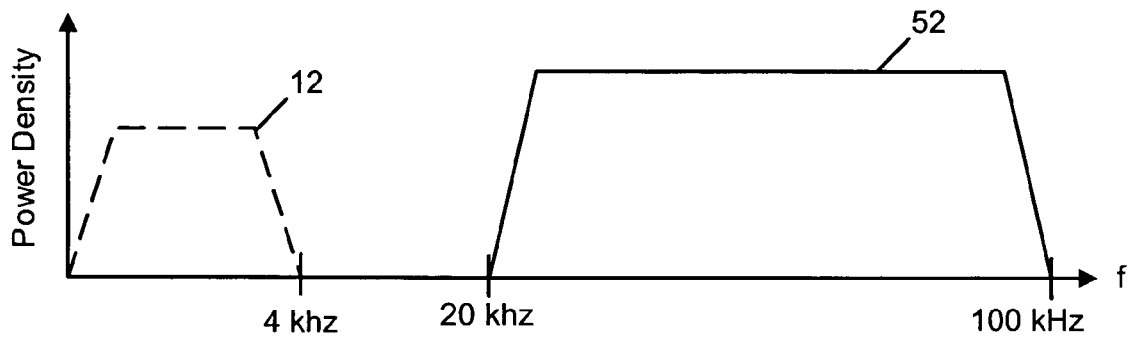
FIG. 3B is a frequency spectrum illustrating the band-limited transmission frequency band of the present invention.

Turning now to FIGS. 3A and 3B, the dynamic allocation and deallocation of the data transmission frequency band is illustrated. Specifically, FIG. 3A illustrates the data transmission frequency band 50 in a full band transmission frequency state, while FIG. 3B illustrates a data transmission frequency band 52 in a band-limited (POTS compatible) transmission frequency state. As illustrated in FIG. 3A, the full-band transmission frequency band 50 extends from approximately 0 Hz (DC) to approximately 100 kHz. In contrast, in FIG. 3B the data transmission frequency band 52 extends from approximately 20 kHz to approximately 100 kHz. In accordance with an important aspect of the preferred embodiment, a modem 20 constructed in accordance with the invention senses the need to dynamically allocate or deallocate a portion of the transmission frequency band in order to accommodate voice communications within the 0 to 4 kHz POTS frequency band 12. As will be described further herein, the present invention may sense this demand for voice transmissions (or band-limiting condition) by sensing an OFF-HOOK condition of a telephone 30, 32 (see FIG. 2) connected to the local loop 26. Alternatively, this band-limiting condition may be detected by an impedance change on the local loop 26.

For phone compatibility, in addition to detecting RING and OFF-HOOK conditions, the system may also be configured to detect voice conversation. Upon voice detection, the system may increase transmit power as it shifts into the band-limited transmission state, to increase data rate dynamically, so long as the voice band SNR is about 30 to 40 dB. When silence is once again detected for a predetermined amount of time, the system will again reduce the transmit power for good idle channel perception.

Unlike typical xDSL communications, where the data transmission frequency band is often 1 MHz in width, the data transmission frequency band of the present invention is much less than that. This permits relatively high-speed data communication without the addition of expensive equipment, such as POTS splitters and POTS filters. Importantly, this addresses a market need from consumers that do not wish to incur, or cannot afford, the additional expenses normally incurred with purchasing an xDSL communication service. An important aspect of the present invention is its ability to sense when voiceband communications are not occurring, or otherwise when a band-limiting condition is not present, and expand the transmission frequency band into the frequency band otherwise reserved for POTS transmissions, and/or increase transmit power to increase the data rate. As can be seen from the illustrations in FIGS. 3A and 3B, expanding the transmission frequency band from a 20 kHz cutoff (FIG. 3B) to approximately DC (FIG. 3A) realizes a 25 percent increase in bandwidth (i.e., from 80 kHz to 100 kHz), and thus realizes a significant improvement in performance.

Figure 3C:
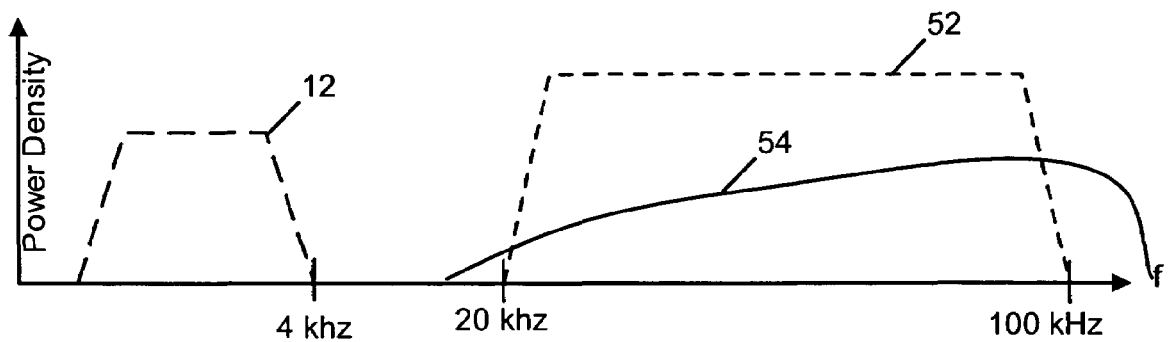
FIG. 3C is a frequency spectrum illustrating a band-limited transmission frequency band of an alternative embodiment of the present invention, having a uniquely shaped xDSL transmission band.
Figure 3D:
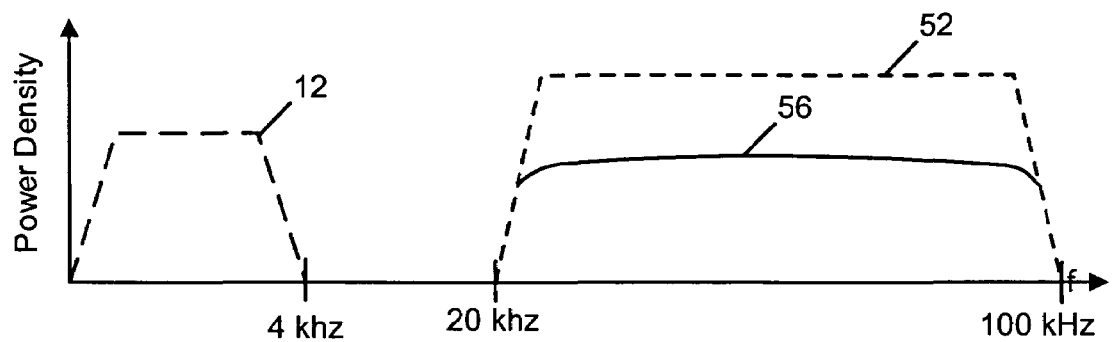
FIG. 3D is a frequency spectrum illustrating a band-limited transmission frequency band of an alternative embodiment of the present invention, having a reduced power xDSL transmission band.

FIGS. 3C and 3D illustrate alternative embodiments of the present invention. In short, FIGS. 3C and 3D illustrate a spectrally-shaped transmission curve and an adaptive power transmission curve, respectively. As illustrated in FIG. 3B, under normal operating conditions, the power density of the xDSL transmission band is greater than that of the POTS transmission band. However, there may be instances when the guard band 16 is not large enough to sufficiently separate the xDSL transmission band 52 from the POTS frequency band 12. As a result, xDSL transmissions may be evident in the POTS frequency band 12 as noise (audible static). The reasons this may occur are varied, and include factors such as telephone set sensitivity and non-linearities. Intermodulation products may also be manifest within the POTS transmission band 12 as noise.

It will be appreciated that, consistent with the concepts and teachings of the present invention, various adaptations of the band-limited transmission state may be implemented to minimize or eliminate noise in the POTS transmission band 12. One solution is to further increase the size of the guard band 16, thereby increasing the frequency separation between the POTS transmission band 12 and the xDSL transmission band 52. Another solution is to adaptively reduce the transmit power of the xDSL transmission band. This solution is illustrated in FIG. 3D, wherein the normal power spectrum 52 is illustrated in dashed line and the reduced power spectrum 56 is superimposed in solid line. Reducing the transmit power in this way reduces the amount of noise that is manifest within the POTS frequency band. The specific amount of power reduction may vary among customer premises, based upon the attached equipment.

Yet another solution is to more particularly define the spectral shape of the transmission band. This solution is illustrated in FIG. 3C. As shown, the power spectrum of the xDSL transmission band 54 may be asymmetrically shaped to provide a greater taper on the lower frequency end of the curve. This taper ensures sufficient attenuation of the xDSL transmission signal above the POTS frequency band 12, and therefore minimizes intermodulation products and noise (resulting from the xDSL transmission) within the POTS band 12. Although only one such shaped signal band 56 is illustrated in FIG. 3D, it will be appreciated that this aspect of the invention is not so limited. Instead, other shapes may be deemed desirable, depending upon the specific environment and line conditions.

Figure 4:
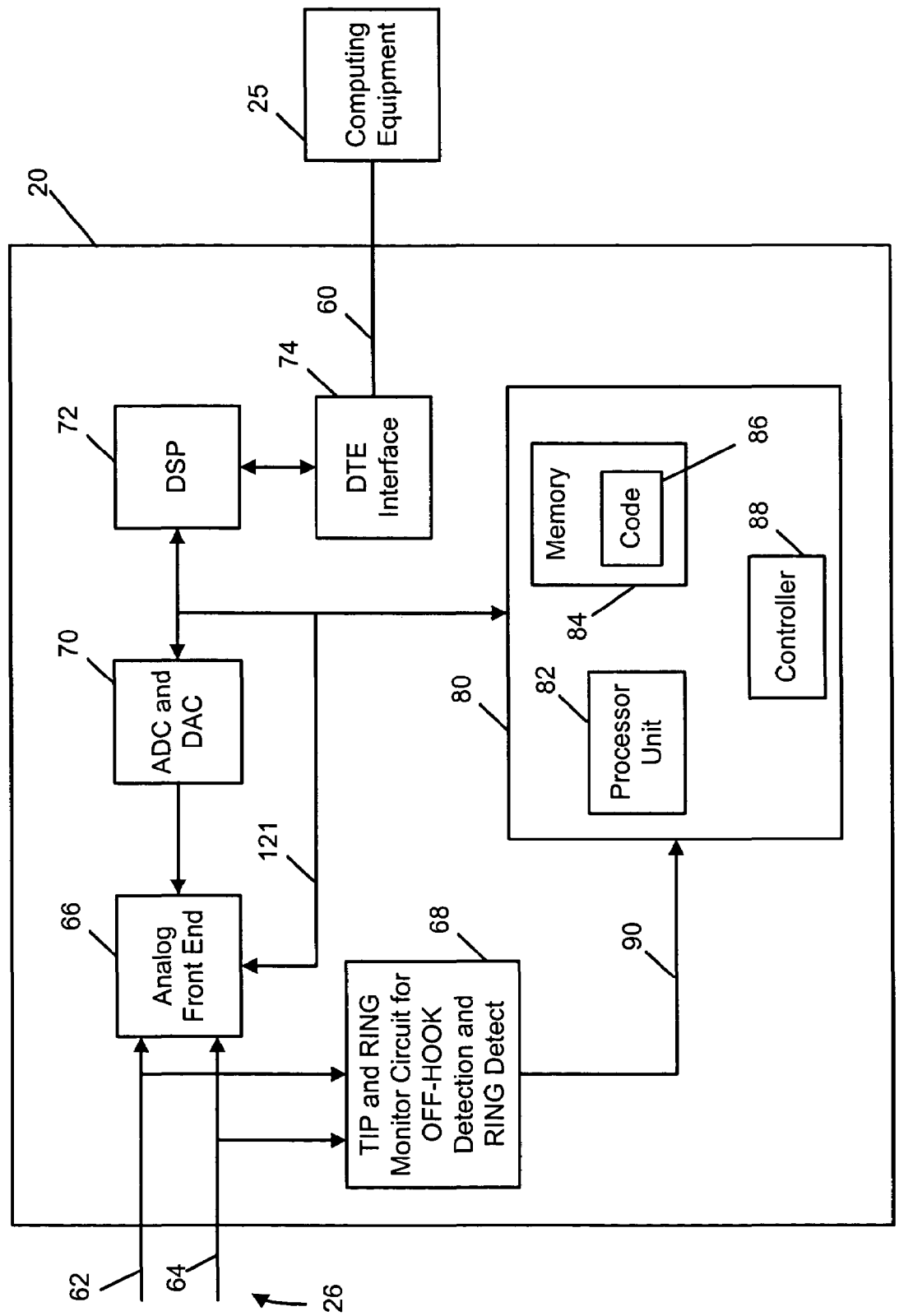
FIG. 4 is a block diagram illustrating the primary components of a modem constructed in accordance with the present invention.

Reference is now made to FIG. 4, which shows a block diagram of a modem 20 constructed in accordance with the present invention. As is common among modems, the modem 20 is in communication with both a local loop 26 and computing equipment 25, such as a personal computer. More specifically, the modem 20 communicates with the computing equipment 25 across line 60. The telephone line 26 is typically comprised of a two wire service, which wires are often denoted as TIP 62 and RING 64. The TIP 62 and RING 64 lines are input to an analog front-end circuit 66 (see FIG. 5) as well as a monitor circuit 68, which is configured to detect an OFF-HOOK condition of the local loop 26.

Analog-to-digital and digital-to-analog converter (ADC and DAC, respectively) circuitry 70 is in communication with the analog front end circuitry 66, and is in further communication with digital signal processor 72. Data received from the local loop 26 passes through the analog front-end 66 and is converted from analog-to-digital form by the analog to digital converter of block 70, before being passed to the digital signal processor 72. Conversely, outgoing data output from the digital signal processor 72 is converted by the digital to analog converter of block 70, before being communicated to the local loop 26, by way of the analog front-end 66. Finally, Data Terminal Equipment (DTE) interface 74 is in communication with the digital signal processor 72 and in further communication across line 60 with the data terminal equipment, such as a computer 25. The analog-to-digital and digital-to-analog converter circuitry 70, the digital signal processing 72, and the DTE interface 74 are all well known and generally operate in accordance with the prior art. Therefore, their individual structure and operation need not be described.

Indeed, a significant component of the modem 20, constructed in accordance with the present invention, is a controller 80 that is in communication with the various other components of the modem 20. While there are various ways to implement the controller 80, one way, as illustrated, is to further partition the controller 80 into functional units denoted as a processing unit 82, a memory 84 (which may further include an executable code segment 86), and a controller 88.

For purposes of the broad concepts of the present invention, the controller 80 receives a signal from the monitor circuit 68 on line 90, which signal indicates whether the invention should transmit data in a band-limited transmission state or a full-band transmission state. In this regard, the monitor circuitry 68 may be configured to detect an OFF-HOOK condition, or alternatively, a RING condition on local loop 26. As is known in the art, the OFF-HOOK condition may be detected by a drop in voltage across the local loop 26, or alternatively, a sudden change in impedance on the local loop 26. On the other hand, a RING detect condition is identified by a low frequency oscillatory voltage on local loop 26. For example, the voltage drops from about 48 volts (on hook) to approximately 10 volts or less (off hook), at the customer premises end of the local loop.

In short, the controller 80 evaluates the signal received on line 90 to determine whether data should be transmitted in the full-band transmission state or the band-limited transmission state. Appropriate signals may, accordingly, be transmitted to the digital signal processor 72 for formulating data transmissions or interpreting received data transmissions.

In accordance with an alternative embodiment of the invention, it will be appreciated that the monitor circuitry 68 may be incorporated within the controller 80, whereby certain signal conditions may be evaluated to detect the band-limiting condition. In this regard, an analog-to-digital converter 70 would also be implemented as part of the controller 80, to generate a signal in digital format which may be more readily evaluated and processed by the processing unit 82. In this regard the processing unit 82 may be a microprocessor, a microcontroller, an application specific integrated circuit (ASIC), or other digital circuitry configured to specifically process information. In the illustrated embodiment, the controller 80 includes fundamental components (processor unit 82, controller 88, memory 84) that together operate to perform distinct computing operations. Such operations may be controlled, for example, by executable code 86 contained within the memory 84.

Figure 5:
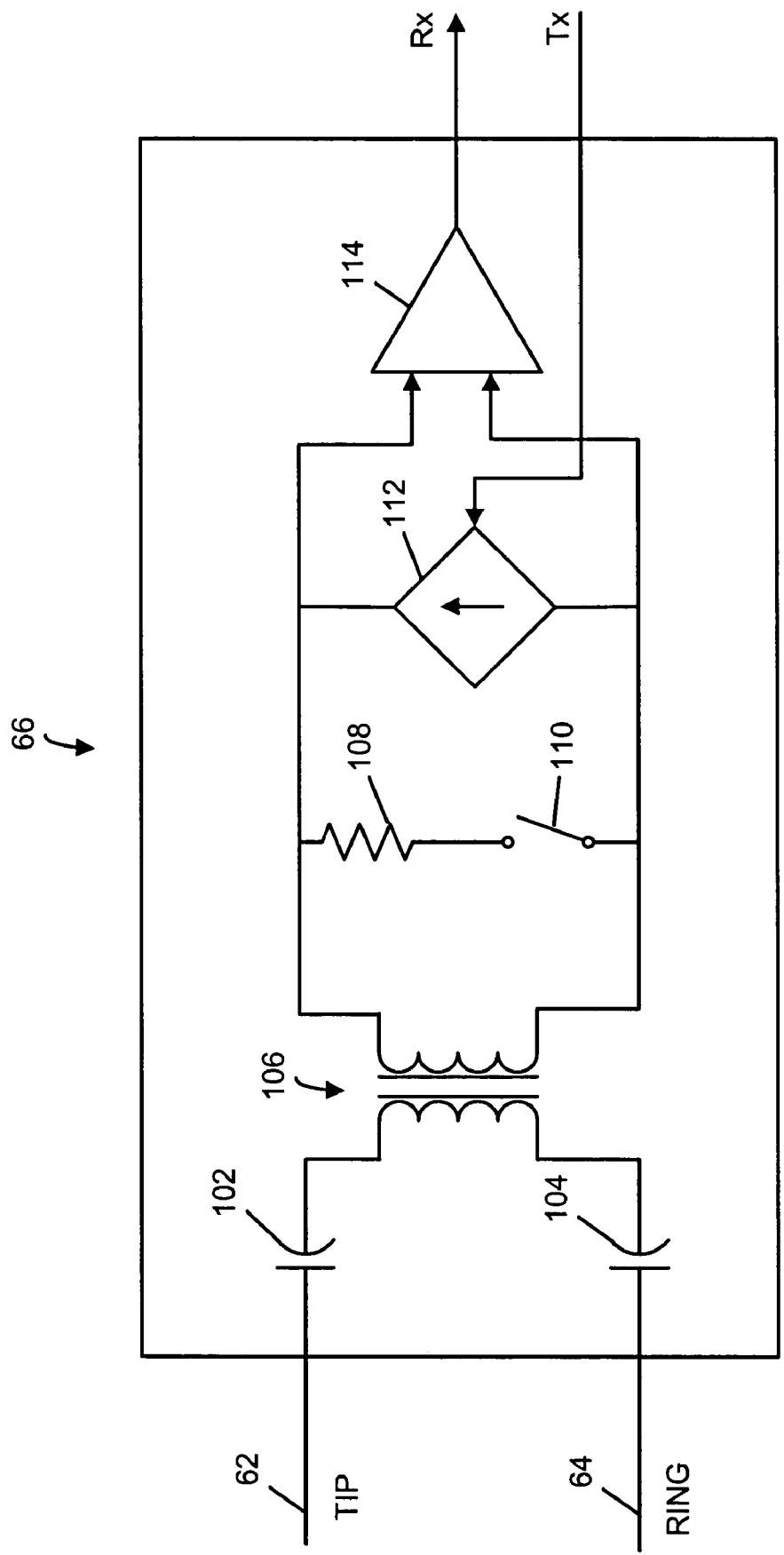
FIG. 5 is a circuit diagram illustrating the analog front end component of the modem block diagram of FIG. 4.

Reference is now made to FIG. 5, which shows a more detailed diagram of the circuitry comprising the analog front end element 66. The preferred embodiment includes blocking capacitors 102 and 104, which are series connected with the TIP 62 and RING 64 signal lines, and serve to block any DC voltage otherwise carried on the TIP 62 and RING 64 lines. A transformer 106 couples alternating current to the remainder of the circuitry, as well as provides safety and signal isolation for the remaining circuitry in the modem. A termination resistor 108 and switch 110 are disposed for series connection with each other (depending upon whether the switch 110 is opened or closed), and together are connected in parallel across the secondary winding of the transformer 106. The switch 110 is controlled by controller 80 (FIG. 4) to close and therefore switch in the terminating resistor 108 when the telephones 30 and 32 (see FIG. 2) are all ON-HOOK (as observed by the monitor circuit 68). The switch 110 may be open to switch out the terminating resistor 108, upon detection of an incoming RING signal or OFF-HOOK on the local loop 26. Capacitors 102 and 104 are chosen to pass data, block DC, and yield acceptable Ringer Equivalence Number per FCC part 68. The switch 110 is generally opened to switch out the terminating resistor when the monitor circuit 68 determines that the local loop 26 is in the OFF-HOOK state. The reason for this is that when one or more telephones are taken OFF-HOOK, then the OFF-HOOK telephone will terminate the line, and the terminating resistor 108 is not needed. Optionally, the switch 110 can be closed in the OFF-HOOK state to improve line termination provided by the OFF-HOOK telephone.

The item represented by reference numeral 112 denotes circuitry that is configured in a form of a dependent current source. The current source is prompted by the transmit signal Tx to create an outgoing transmission signal. As a current source, the item 112 has a very high impedance (as seen across the secondary winding of transformer 106), and therefore, only the termination resistor 108 operates to terminate the line (when switched in). Similarly, amplifier 114 is the receive amplifier that generates the receive signal, Rx, as is known in the art. Like the current source 112, the amplifier 114 has an extremely high input impedance and thus does not affect line termination.

Figure 6:
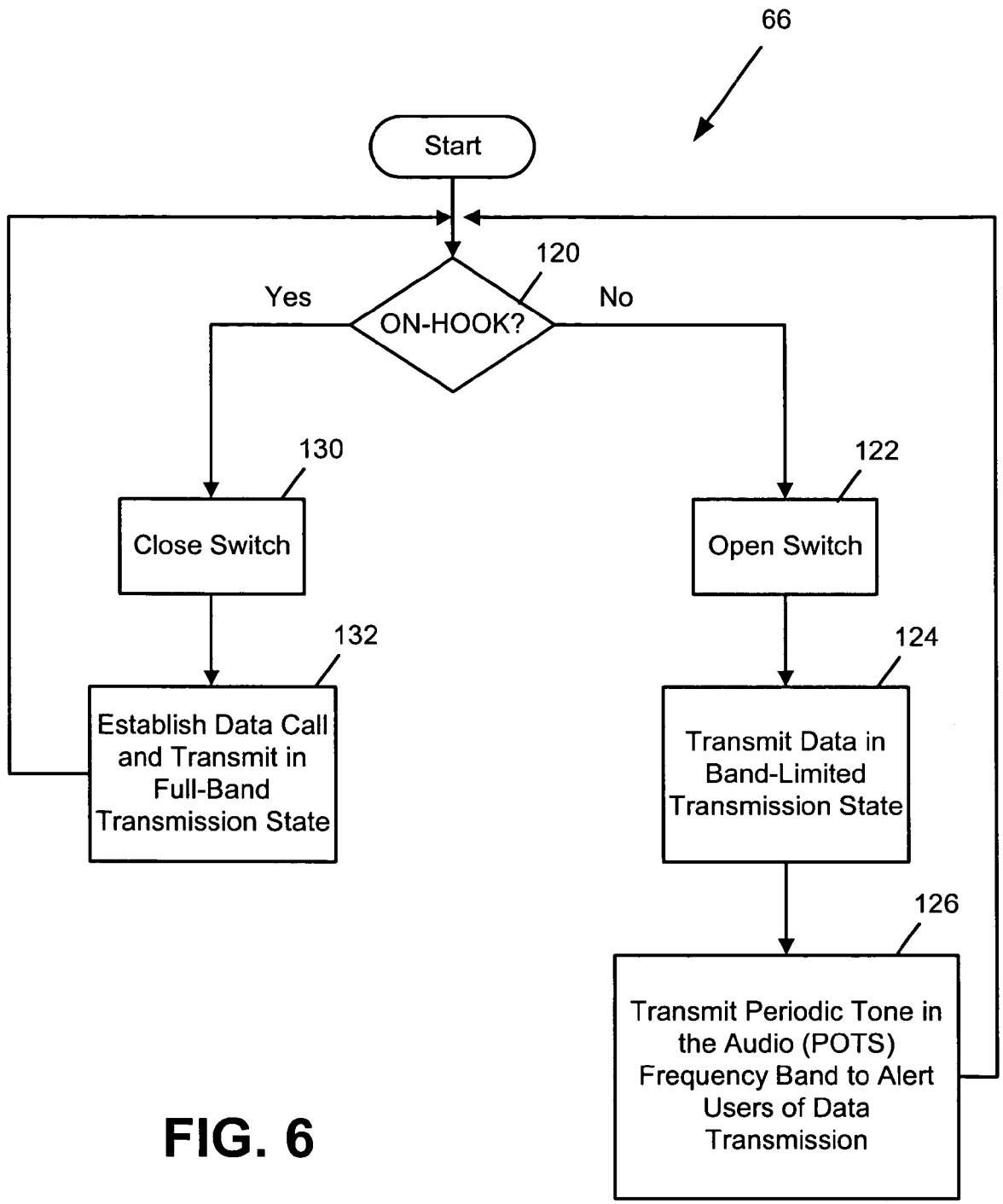
FIG. 6 is a software flowchart depicting the functional operation of the analog front end element, illustrated in FIG. 5

Reference is now made to FIG. 6, which shows a software flow-chart illustrating the operation of the analog front-end element 66 of FIG. 5. Beginning at step 120, the element 66 determines whether the local loop 26 is ON-HOOK or OFF-HOOK. As will be appreciated from the foregoing discussion, this decision is made by the controller 80, which outputs a signal 121 (see FIG. 4) to the analog front-end 66 indicative of the ON-HOOK/OFF-HOOK status. If the resolution of step 120 is NO, the analog front-end element 66 opens switch 110 (step 122) to remove the termination resistor 108 from the circuit. That is, if the system detects that a telephone connected to the local loop 26 is OFF-HOOK, it will remove the termination resistor 108 from the circuit, since the line will then be terminated by the OFF-HOOK telephone. Thereafter, operation proceeds to step 122, wherein data is transmitted in accordance with the band-limited transmission frequency band (e.g., 20 kHz–100 kHz). In accordance with one embodiment of the present invention, the system may emit periodic tones within the audible frequency range to alert a user talking on an attached telephone 30, 32 (see FIG. 2) that the local loop 26 is also being used for data transmissions. Thus, a person, for example, speaking in another part of the house over a telephone and hearing periodic beeps would know that someone else in the household is using a computer 25 (see FIG. 2) to communicate data, and therefore, may wish to keep his or her conversation to a minimum, in order to free up the local loop 26. In this way, the present invention may obtain full utilization of the full-banded transmission frequency band for maximum data throughput.

If the resolution of step 120 is YES, indicating that all telephones 30, 32 (see FIG. 2) attached to the local loop 26 are ON-HOOK, then the system ensures that switch 110 is closed thereby placing termination resistor 108 in the circuit, so as to achieve proper line termination (step 130). Thereafter, the system may transmit data across the local loop utilizing the entire, full-band transmission frequency (i.e., DC to approximately 100 kHz).

Figure 7:
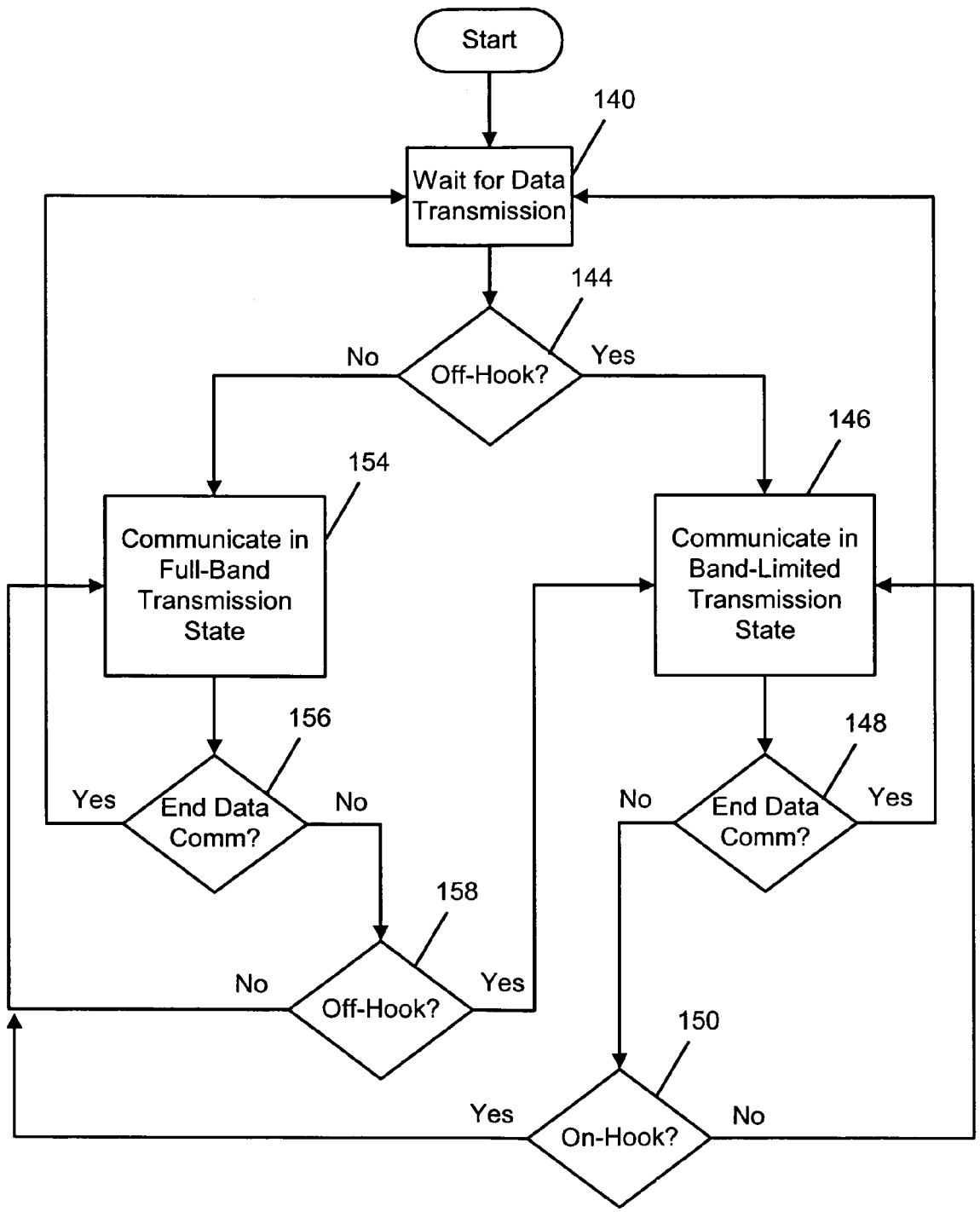
FIG. 7 is a software flowchart illustrating the top-level operation of a system constructed in accordance with the present invention.

Reference is now made to FIG. 7, which is a software flow-chart illustrating the top-level operation of a system communicating in accordance with the present invention. Beginning at block 140, the system awaits the initiation of data transmission. This initiation may occur either upon the instruction of a user at the computer 25 (see FIG. 2), or alternatively, from a remote user that is dialing the phone number of computer 25 to connect up to that computer. (This assumes that computer 25 is in auto answer mode.) Once the system has been instructed to begin data communications, it first makes a check (at step 144) to determine whether the loop is in the OFF-HOOK state. If so, it begins the data communications in the band-limited frequency transition state (step 146) (e.g., 20 kHz–100 kHz). During the data transmissions, the system will make continuous checks to determine whether the data transmission has ended (step 148), or whether the band-limiting condition has subsided (step 150). As previously mentioned, the band-limiting condition is generally identified by the OFF-HOOK detection circuitry. If the end data communications check, at step 148, resolves to YES, then the system returns to step 140. If not, the system proceeds to step 150 where it checks for the cessation of the band-limiting condition. If this step resolves to YES, then the system continues the data transmission in the full-band transmission frequency bandwidth (step 154).

Returning to the decision block 144, if, upon initiation of data communication, the system determines that all telephones are presently ON-HOOK, then the system proceeds to step 154 where it transmits data in accordance with the full-band data transmission state (i.e., utilizing the full 0 to 100 kHz transmission frequency bandwidth). During transmission in this frequency band, the system periodically checks to see if the data communications has terminated (step 156), or whether the occurrence of a band-limiting condition has occurred (step 158). This latter condition occurs, for example, when a person lifts a handset of an attached telephone 30, 32 (see FIG. 2). If this occurs, the system proceeds to step 146 and continues the data transmissions in accordance with the band-limited transmission frequency band (20 kHz–100 kHz).

It will be appreciated from a review of the flow-chart of FIG. 7, that the system, during data transmission, can dynamically shift back and forth between the full-band and band-limited transmission frequency bandwidths as users may lift or reset telephone 30, 32 (see FIG. 2) handsets or as RING conditions occur. It will be appreciated, however, that other band-limiting conditions (other than RING or OFF-HOOK) may be utilized to invoke the frequency shifting feature of the present invention, depending upon the system configuration or other pertinent system factors.

It will be appreciated that the invention described herein could provide a low-cost solution to Internet access for the mass consumer market. In this regard, it could fill the gap between low-cost 33.6 kbps modems and high speed xDSL modems, which require the addition of relatively expensive equipment (such as POTS splitters and POTS filters) at the customer premises, and is labor intensive. The present invention, as described above, generally achieves transmission rates in the range of 64 kbps to 640 kbps.

As described above, the invention utilizes the low frequency portion of the telephone subscriber loop spectrum (roughly DC to approximately 100 kHz) to transport user data. The modulation could be carrierless amplitude-phase (CAP), quadrature amplitude modulation (QAM), discrete multi-tone (DMT), spread spectrum, etc., as the invention is not limited to any particular form. Utilization of the lower frequency portion of the telephone subscriber loop has the advantage of the lowest possible signal attenuation (usually the number one signal impairment in data communications) and low cross-talk. Other advantages are reduced transmission line concerns like reflections due to stubs.

In use, the invention requires a simple bridge (electrical parallel) connection to the subscriber loop or premise wiring. Therefore, one unit would connect (in bridge fashion) at the central office, and one companion unit connect at the customer premises.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

Therefore, having thus described the invention, at least the following is claimed:

1. A method for communicating data over a subscriber loop using a modem, the method comprising the steps of:
   transmitting data on the subscriber loop in a first frequency band;
   sensing an indication that simultaneous transmission of signals on the subscriber loop in a POTS frequency band is imminent; and
   adjusting transmit power in the first frequency band, in response to the sensing step.

2. The method of claim 1, wherein first frequency band has a lower boundary of approximately 20 kHz.

3. The method of claim 1, wherein the adjusting step comprises reducing transmit power in the first frequency band.

4. The method of claim 1, wherein the adjusting step adjusts transmit power such that interference with transmitted signals in the POTS frequency band is reduced.

5. The method of claim 1, further comprising shaping a power spectrum of the first transmit band such that interference with transmitted signals in the POTS frequency band is reduced.

6. The method of claim 1, further comprising sensing an indication that cessation of the simultaneous transmission is imminent.

7. The method of claim 6, further comprising adjusting transmit power in the first frequency band, in response to a cessation of the simultaneous transmission.

8. The method of claim 6, wherein the adjusting transmit power in the first frequency band comprises increasing transmit power in the first frequency band.

9. The method of claim 1, wherein the sensing step comprises sensing an incoming ring signal on the subscriber loop.

10. The method of claim 1, wherein the sensing step comprises sensing a voice conversation on a telephone electrically connected to the subscriber loop.

11. The method of claim 1, wherein the sensing step comprises sensing an off-hook condition of a telephone electrically connected to the subscriber loop.

12. The method of claim 11, wherein the sensing of an off-hook condition step comprises sensing a change in impedance of the subscriber loop.

13. The method of claim 11, wherein the sensing of an off-hook condition step comprises sensing a voltage on the subscriber loop.

14. A modem for communicating data across a subscriber loop comprising:
- an input/output connection in communication with the subscriber loop;
- a processor unit configured to operate in one of at least two states, the first state characterized by a first transmit power spectrum in a first frequency band, the second state characterized by a second transmit power spectrum in the first frequency band, where the second transmit power spectrum is reduced relative to the first transmit power spectrum;
- a sensing means for sensing a demand for simultaneous usage of the subscriber loop, where said usage occurs in a POTS frequency band; and
- a control means responsive to the sensing means for controlling the operating state of the processor unit, wherein upon the sensing of demand for usage, the control means causes the processor to operate in the second state.

15. The modem of claim 14, further comprising a sensing means for sensing no demand for usage of the POTS frequency band, wherein upon the sensing of no demand, the control means causes the processor to operate in the first state.

16. The modem of claim 15, wherein the sensing means further comprises a means for detecting an incoming ring signal on the subscriber loop.

17. The modem of claim 15, wherein the sensing means further comprises a means for sensing a voice conversation on a telephone electrically connected to the subscriber loop.

18. The modem of claim 15, wherein the sensing means further comprises a means for sensing an off-hook condition of a telephone electrically connected to the subscriber loop.

19. The modem of claim 18, wherein the means for sensing an off-hook condition comprises a means for sensing an impedance change on the input/output connection.

20. The modem of claim 18, wherein the means for sensing an off-hook condition comprises a means for sensing a voltage drop on the input/output connection.

21. A method for dynamically communicating data over a subscriber loop using a modem, the method comprising the steps of:
- transmitting data in a first frequency band;
- sensing an indication that cessation of simultaneous transmission of signals on the subscriber loop in a POTS frequency band is imminent; and
- adjusting transmit power in the first frequency band, in response to the sensing step.

22. The method of claim 21, wherein the first frequency band has a lower boundary of approximately 20 kHz.

23. The method of claim 21, wherein the adjusting step comprises increasing transmit power in the first frequency band.

24. The method of claim 21, wherein the sensing step comprises sensing an on-hook condition of a telephone electrically connected to the subscriber loop.

25. A modem for communicating data across a subscriber loop comprising:
- an input/output connection in communication with the subscriber loop;
- a processor unit configured to operate in one of at least two states, the first state characterized by a first transmit power spectrum in a first frequency band, the second state characterized by a second transmit power spectrum in the first frequency band, where the second transmit power spectrum is reduced relative to the first transmit power spectrum;
- a sensing means for sensing a cessation in demand for simultaneous usage of the subscriber loop, where said usage occurs in a POTS frequency band; and
- a control means responsive to the sensing means for controlling the operating state of the processor unit, wherein upon the sensing of cessation, the control means causes the processor to operate in the first state.

26. The modem of claim 25, wherein the sensing means further comprises a means for sensing an on-hook condition of a telephone electrically connected to the subscriber loop.

27. The modem of claim 26, wherein the means for sensing an on-hook condition comprises a means for sensing an impedance change on the input/output connection.

28. The modem of claim 26, wherein the means for sensing an off-hook condition comprises a means for sensing a voltage increase on the input/output connection.

* * * * *